Feb. 23, 1954  C. JUHOLA  2,669,735
APPARATUS FOR ATTACHING SOLES TO SHOES
Filed March 14, 1950  2 Sheets-Sheet 1

Inventor
Carl Juhola
By his Attorney

Feb. 23, 1954  C. JUHOLA  2,669,735
APPARATUS FOR ATTACHING SOLES TO SHOES
Filed March 14, 1950  2 Sheets-Sheet 2
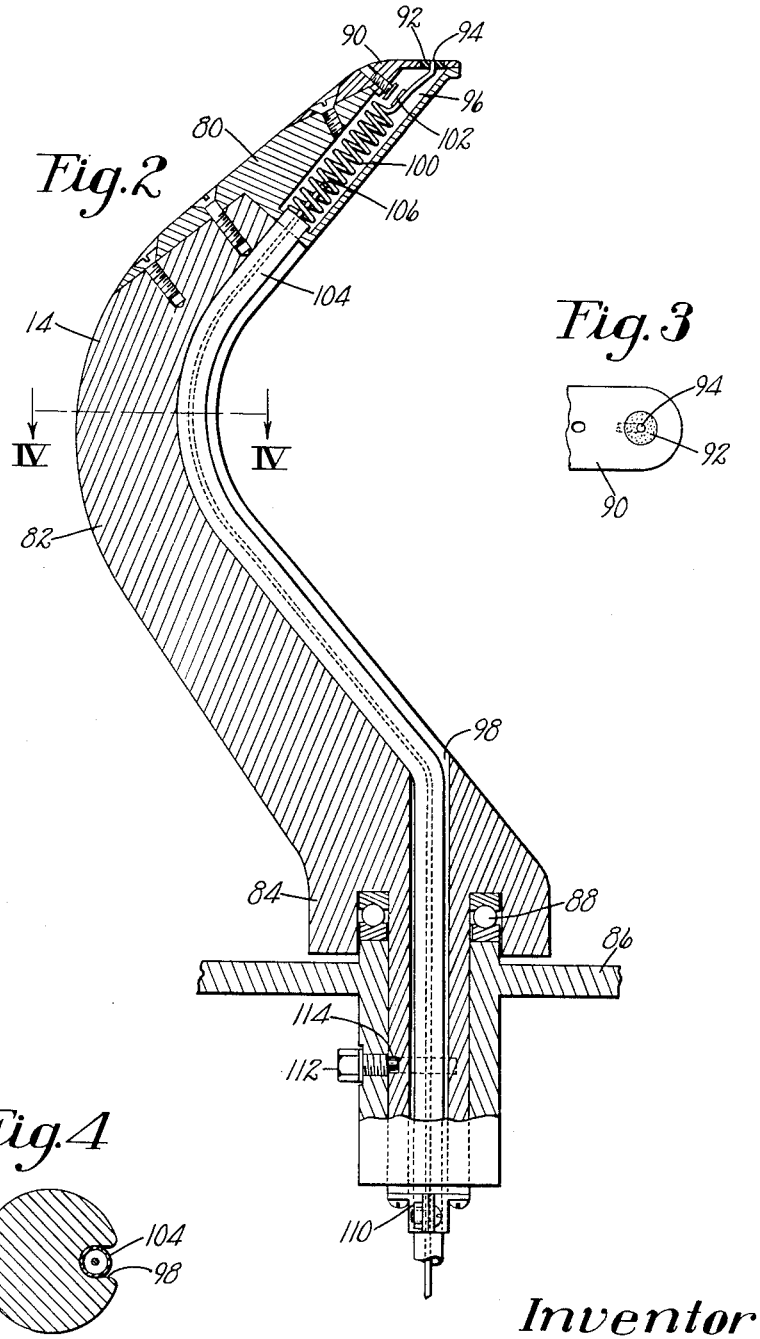
Inventor
Carl Juhola
By his Attorney Patented Feb. 23, 1954

2,669,735

UNITED STATES PATENT OFFICE 2,669,735

APPARATUS FOR ATTACHING SOLES TO SHOES

Carl Juhola, Manchester, Mass., assignor to United Shoe Machinery Corporation, Flemington, N. J., a corporation of New Jersey Application April 14, 1950, Serial No. 156,015

10 Claims. (Cl. 12—33.2)

This invention relates to apparatus for attaching soles to shoes and more particularly to apparatus for adhesively securing soles to shoes in which dielectric heat is employed to activate potentially tacky material at the attaching surfaces of the shoe parts to cause the material to become tacky. For example, the attaching surfaces of the shoe and sole may each be coated with a thermoactive adhesive or one or both parts may comprise thermoplastic material. Where a solvent-type adhesive is employed, dielectric treatment causes activation of the adhesive in part by driving out the solvent. For brevity herein all such types of activation will be comprehensively referred to as activation of an adhesive.

While the desirability of dielectric activation of adhesives in sole attaching has long been appreciated, great difficulty has arisen in providing apparatus for progressive dielectric sole attaching which is at once convenient and effective.

Accordingly, it is an object of the invention to provide an improved form of apparatus for progressively attaching soles to shoes by dielectrically-activated adhesive.

A feature of the invention resides in a shoe-entering and supporting horn having a pair of stray-field electrodes embodied in its shoe-bottom-engaging end portion. The horn is adapted to cooperate with a pressure member and work feed means to form a convenient and effective apparatus for progressive adhesive sole attaching.

Other features and advantages of the invention will best be understood by reference to a particular embodiment hereinafter described in the specification, taken in connection with the accompanying drawings, in which Fig. 1 is a front elevation of a portion of an apparatus embodying the invention and operating upon a shoe shown in section;

Fig. 2 is a view partly in section of a shoe entering and supporting horn shown in Fig. 1;

Fig. 3 is a plan view of the tip of the shoe-bottom-engaging end portion of the horn; and Fig. 4 is a sectional view taken on line IV—IV of Fig. 2.

Figure 1:
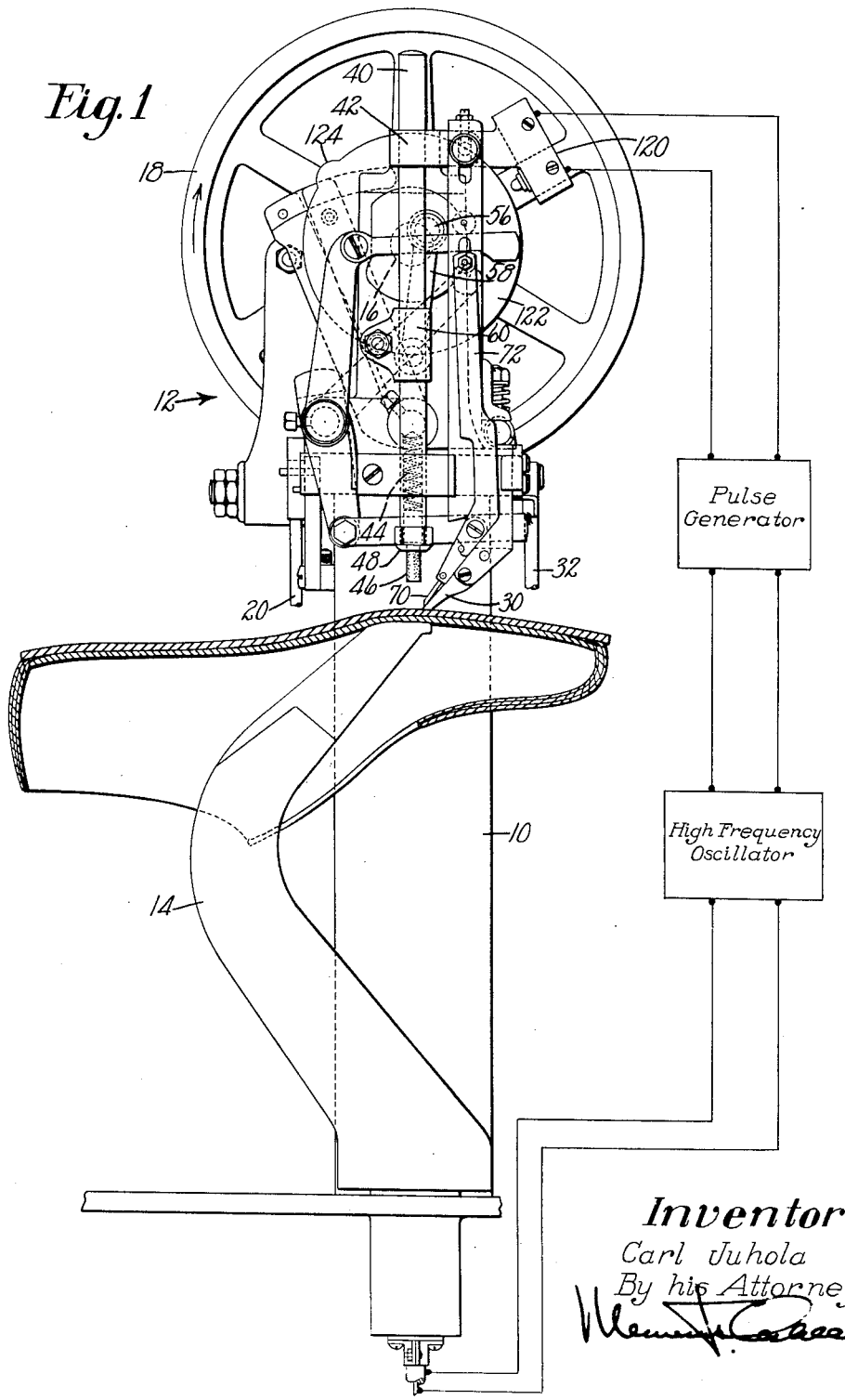

The machine illustrated in Fig. 1 is, except as hereinafter specified, similar to a machine of a type disclosed in United States Letters Patent No. 710,612, granted October 7, 1902, on an application of E. P. Richardson, which machine is related to that class known as "McKay" sewing machines.

Referring to Fig. 1, the machine thus comprises a standard 10 having a suitable base (not shown), the upper portion of the standard being bent rearwardly and then forwardly to receive a base plate (not shown) on which a head 12 is secured. In the front of the standard, provision is made for the reception of a rotatable horn 14 later to be described in detail.

The head comprises the base plate having uprights (not shown) in which a power shaft 16 is journaled, said shaft projecting rearwardly to receive a loosely-mounted pulley 18 which is arranged to be belt driven at one of two different speeds from mechanism controlled by a treadle (not shown) connected by a rod 20 to control a pawl and ratchet mechanism in the head whereby, when the treadle is depressed, the pulley 18 is connected to drive the shaft 16.

A spring-biased presser foot 30 is arranged to rest upon the sole of a shoe on the horn at a location above the end of the horn and a little to one side of its axis of rotation. By means of a pedal connected to a rod 32, the presser foot may be raised to permit the insertion of a shoe.

In lieu of the needle-bar 106 and the associated cast-off mechanism of the aforesaid Letters Patent, a vertically reciprocatory pressure-member bar 40 is mounted in the head and arranged to reciprocate in guides mounted in a bracket 42 and in an extension of the bed plate. The lower end of the bar 40 is recessed to contain a relatively strong spring 44. The large end of a pressure member 46, preferably constructed of dielectrical material and having end portions of different diameters, is held against the spring within the recess by a collar 48 having an aperture slidably fitting the small end. Motion is transmitted to the bar 40 from the shaft 16 by a pitman 56 connected by a link 58 directly with a collar 60 rigidly secured to the bar 50. Thus when the shaft 16 is rotated, the pressure member is reciprocated, and in its lowered position is adapted to cooperate with the horn in applying a localized attaching pressure to a sole and shoe on the horn.

The feeding mechanism comprises a point 70 secured in an arm 72 and operated to advance the work in feed steps in timed relation with the movements of the pressure member bar 40.

A feature of the invention which is adapted to cooperate in sole attaching with the above described pressure and work-feed mechanism comprises a novel shoe entering and supporting horn having a pair of stray-field electrodes embodied in its shoe entering end portion.

As shown in Fig. 2 the horn 14 comprises an end portion 80, a body portion 82 and a base portion 84. The horn is rotatably supported on a frame 86 in front of the standard 10 by ball bearings 88 in the base portion. The tip 90 of the end portion, which tip forms one electrode, is preferably made of steel and is formed with a dielectric disk 92 inserted in its upper surface, the center of the disk lying on the axis of rotation of the horn. The other electrode 94 is a conductive button located at the center of the disk.

The remainder of the end portion 80 is made of conductive material, for example, brass, and together with tip 90 bounds a cavity 96 forming an extension of a channel 98 in the horn. A resonant circuit comprising a coil 100 and a screw-operated variable condenser 102 is disposed in the cavity and connected across the electrodes. A coaxial cable 104 has its outer conductor connected to the horn and thus to the outer electrode and to one end of coil 100, all of these elements being maintained at substantially ground potential. The central conductor is connected to some point 106 on the coil to provide an impedance match. The coaxial cable extends in the channel 98 from the resonant circuit down through the body portion 82 and out through the base portion 84 where the cable is held by a clamp 110 against twisting in the horn as it is rotated. A stop pin 112 and groove 114 are provided to limit the rotation of the horn to about 270° to prevent breaking of the cable by rotation of the horn.

The coaxial cable is connected to a conventional high-frequency oscillator as shown diagrammatically in Fig. 1. In order to maintain uniform the activation of the adhesive when the operator slows the operation of the machine, for example, in operating on the toe portion of the shoe, the oscillator is arranged for control by a conventional pulse generator to energize the electrodes at each step for a predetermined interval, the pulses being initiated by closure of a switch 120 connected to the pulse generator and mounted adjacent to a disk 122 which is provided with a cam rise 124 arranged operatively to engage the switch in timed relation to the movement of the presser member and during its application to the work.

If desired, the pulse generator and switch may be omitted and the oscillator controlled for continuous output during operation of the machine by a switch controlled by the treadle.

In operation, the operator by pressing the pedal raises the presser foot, supports an adhesive-coated and superposed sole and shoe on the horn, and releases the pedal to rest the presser foot on the sole. He may then commence the attaching operation by pressing the treadle and guiding the shoe periphery over the horn.

While I have herein described a preferred embodiment of my invention, I do not intend it to be limited other than by the limitations of the appended claims.

Having thus described my invention, what I claim as new and desire to secure by Letters Patent of the United States is:

1. Apparatus for attaching soles to shoes wherein the parts are assembled with adhesive between their attaching surfaces comprising a shoe entering and supportnig horn having an end portion adapted slidably to engage a shoe bottom inside the shoe in successive marginal areas, means embodied in the tip of said end portion and energizable to activate adhesive between the shoe and a sole superposed thereon, means for connecting said activating means to a source of energy, and means cooperating with said end portion for applying a localized attaching pressure to the shoe and sole.

2. Apparatus for adhesively attaching soles to shoes wherein the parts are assembled with adhesive between their attaching surfaces comprising a shoe entering and supporting horn having an end portion adapted slidably to engage the inside margin of the bottom of a shoe having a sole superposed thereon, a pair of electrodes embodied in said end portion, means for connecting the electrodes to a source of high-frequency electric energy, and a pressure member cooperative with said horn for applying localized attaching pressure to the sole and shoe.

3. Apparatus for adhesively attaching soles to shoes wherein the parts are assembled with adhesive between their attaching surfaces comprising a shoe entering and supporting horn having an end portion adapted slidably to engage the inside margin of the bottom of a shoe having a sole superposed thereon, a pair of electrodes embodied in said end portion, means for connecting the electrodes to a source of high-frequency electric energy, means for feeding the sole and shoe relatively to said electrodes, and mechanism for pressing the sole against the shoe bottom in areas adjacent to the electrodes.

4. Apparatus as in claim 3 and additionally comprising means for energizing said electrodes from a source of high-frequency electric energy for a predetermined interval not varying with the rate of speed during the application of pressure by said mechanism.

5. In apparatus for attaching soles to shoes, a shoe entering and supporting horn having a base portion and having an end portion adapted slidably to engage the inside margin of a shoe bottom, and activating means embodied in the tip of said end portion for activating adhesive between shoe parts superposed on said tip.

6. Apparatus as in claim 5 and additionally comprising means extending from said activating means down through a channel in the horn and out through the base portion of said horn for connecting said activating means to a source of energy.

7. In apparatus for attaching soles to shoes, a shoe entering and supporting horn having a base portion and having an end portion adapted slidably to engage the inside margin of a shoe bottom, said horn having a pair of electrodes embodied in said end portion.

8. Apparatus as in claim 7 and additionally comprising connections extending from said electrodes down through a channel in the horn and out through said base portion for supplying said electrodes with high-frequency electric energy.

9. In apparatus for attaching soles to shoes, a shoe entering and supporting horn having a base portion and having an end portion adapted slidably to engage the inside margin of a shoe bottom, a pair of electrodes embodied in said end portion, a resonant circuit in said end portion and connected to said electrodes, and a transmission line connected to said resonant circuit and extending down through a channel in the horn and out through said base portion.

10. In apparatus of the class described, a rotatable McKay type shoe entering and supporting horn having a base portion and an end portion adapted to engage the bottom of a shoe, a pair of electrodes embodied in said end portion, a tunable resonant circuit in said end portion and connected to the electrodes, a flexible coaxial cable connected to said resonant circuit and extending to and through said base portion while being disposed entirely within a channel formed in said horn, and means for holding said coaxial cable against twisting in said horn.

CARL JUHOLA.

References Cited in the file of this patent

UNITED STATES PATENTS

| Number | Name | Date |
|---|---|---|
| 556,159 | Peare | Mar. 10, 1896 |
| 2,109,323 | Smith | Feb. 22, 1938 |
| 2,446,343 | Reasor | Aug. 3, 1948 |
| 2,492,347 | Ashley | Dec. 27, 1949 |
| 2,506,626 | Zottu | May 9, 1950 |

FOREIGN PATENTS

| Number | Country | Date |
|---|---|---|
| 601,855 | Great Britain | May 13, 1948 |
| 611,944 | Great Britain | Nov. 5, 1948 |
| 616,436 | Great Britain | Jan. 21, 1949 |